United States Patent
Baron

(10) Patent No.: US 9,047,313 B2
(45) Date of Patent: Jun. 2, 2015

(54) STORING VIRTUAL MACHINES ON A FILE SYSTEM IN A DISTRIBUTED ENVIRONMENT

(75) Inventor: Ayal Baron, Kiryat Ono (IL)

(73) Assignee: Red Hat Israel, Ltd., Raanana (IL)

(*) Notice: Subject to any disclaimer, the term of this patent is extended or adjusted under 35 U.S.C. 154(b) by 303 days.

(21) Appl. No.: 13/091,582

(22) Filed: Apr. 21, 2011

(65) Prior Publication Data

US 2012/0272238 A1    Oct. 25, 2012

(51) Int. Cl.
*G06F 9/455* (2006.01)
*G06F 12/00* (2006.01)
*G06F 17/30* (2006.01)

(52) U.S. Cl.
CPC .... *G06F 17/30238* (2013.01); *G06F 17/30194* (2013.01); *G06F 9/45558* (2013.01); *G06F 2009/45562* (2013.01); *G06F 2009/45579* (2013.01); *G06F 17/30165* (2013.01)

(58) Field of Classification Search
None
See application file for complete search history.

(56) References Cited

U.S. PATENT DOCUMENTS

| | | | | |
|---|---|---|---|---|
| 7,266,637 B1* | 9/2007 | van Rietschote | ............ | 711/112 |
| 8,082,230 B1* | 12/2011 | Root | ............... | 707/661 |
| 8,171,201 B1* | 5/2012 | Edwards, Sr. | ............... | 711/6 |
| 8,219,653 B1* | 7/2012 | Keagy et al. | ............... | 709/222 |
| 8,260,816 B1* | 9/2012 | Vaghani et al. | ............... | 707/791 |
| 8,407,448 B1* | 3/2013 | Hayden et al. | ............... | 711/203 |
| 8,413,146 B1* | 4/2013 | McCorkendale et al. | ........ | 718/1 |
| 2006/0136667 A1* | 6/2006 | Shultz et al. | ............... | 711/118 |
| 2007/0180509 A1* | 8/2007 | Swartz et al. | ............... | 726/9 |
| 2008/0104144 A1* | 5/2008 | Rajan | ............... | 707/204 |
| 2008/0155223 A1* | 6/2008 | Hiltgen et al. | ............... | 711/173 |
| 2008/0172554 A1* | 7/2008 | Armstrong et al. | ............... | 713/2 |
| 2008/0263306 A1* | 10/2008 | Tanizawa | ............... | 711/170 |
| 2009/0007105 A1* | 1/2009 | Fries et al. | ............... | 718/1 |
| 2009/0150640 A1* | 6/2009 | Royer et al. | ............... | 711/173 |
| 2009/0241109 A1* | 9/2009 | Vandegrift et al. | ............... | 718/1 |
| 2009/0307438 A1* | 12/2009 | Logan et al. | ............... | 711/153 |
| 2010/0011178 A1* | 1/2010 | Feathergill | ............... | 711/162 |
| 2010/0235832 A1* | 9/2010 | Rajagopal et al. | ............... | 718/1 |
| 2010/0257326 A1* | 10/2010 | Otani et al. | ............... | 711/162 |
| 2011/0010390 A1* | 1/2011 | Rajagopal et al. | ............... | 707/770 |
| 2011/0061049 A1* | 3/2011 | Kobayashi et al. | ............... | 718/1 |
| 2011/0119669 A1* | 5/2011 | McRae | ............... | 718/1 |
| 2012/0151177 A1* | 6/2012 | Kalach et al. | ............... | 711/203 |
| 2012/0158647 A1* | 6/2012 | Yadappanavar et al. | ...... | 707/609 |
| 2012/0158803 A1* | 6/2012 | Kandasamy et al. | .......... | 707/822 |
| 2012/0185553 A1* | 7/2012 | Nelson | ............... | 709/209 |
| 2012/0198443 A1* | 8/2012 | Tatavarty | ............... | 718/1 |
| 2012/0226885 A1* | 9/2012 | Mori et al. | ............... | 711/170 |
| 2012/0266162 A1* | 10/2012 | Baron | ............... | 718/1 |

* cited by examiner

*Primary Examiner* — Adam Lee

(74) *Attorney, Agent, or Firm* — Lowenstein Sandler LLP

(57) ABSTRACT

A mechanism for storing virtual machines on a file system in a distributed environment is disclosed. A method of the invention includes initializing creation of a VM by a hypervisor of a host machine, allocating a logical volume from a logical volume group of a shared storage pool to the VM, and creating a file system on top of the allocated logical volume, the file system to manage all files, metadata, and snapshots associated with the VM.

20 Claims, 4 Drawing Sheets

300 

```
┌─────────────────────────────────────────────────────────────────────┐
│   Access a VM as part of initialization of the VM by mounting a file system │
│                    associated with the VM                            │
│                                                                 310  │
└─────────────────────────────────────────────────────────────────────┘
                                   │
                                   ▼
┌─────────────────────────────────────────────────────────────────────┐
│   File any snapshots created as part of running the VM into the file system │
│                    associated with the VM                            │
│                                                                 320  │
└─────────────────────────────────────────────────────────────────────┘
                                   │
                                   ▼
┌─────────────────────────────────────────────────────────────────────┐
│  Manage files and metadata associated with the VM via the mounted file system │
│        using typical file system commands of the particular file system │
│                                                                 330  │
└─────────────────────────────────────────────────────────────────────┘
                                   │
                                   ▼
┌─────────────────────────────────────────────────────────────────────┐
│           Shut down VM and remove file system from host machine       │
│                                                                 340  │
└─────────────────────────────────────────────────────────────────────┘
```

*Fig. 3*

STORING VIRTUAL MACHINES ON A FILE SYSTEM IN A DISTRIBUTED ENVIRONMENT

TECHNICAL FIELD

The embodiments of the invention relate generally to virtualization systems and, more specifically, relate to a mechanism for storing virtual machines on a file system in a distributed environment.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a hypervisor manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The hypervisor virtualizes the underlying hardware of the host machine or emulates hardware devices, making the use of the VM, transparent to the guest OS or the remote client that uses the VM.

In a distributed virtualization environment, files associated with the VM, such as the OS, application, and data files, are all stored in a file or device that sits somewhere in shared storage that is accessible to many physical machines. Managing VMs requires synchronizing VM disk metadata changes between host machines to avoid data corruption. Such changes include creation and deletion of virtual disks, snapshots etc. The typical way to do this is to use either a centrally managed file system (e.g., Network File System (NFS)) or use a clustered file system (e.g., Virtual Machine File System (VMFS), Global File System 2 (GFS2)). Clustered file systems are very complex and have severe limitations on the number of nodes that can be part of the cluster (usually n<32), resulting in scalability issues. Centrally-managed file systems, on the other hand, usually provide lower performance and are considered less reliable.

Some virtualization systems utilize a Logical Volume Manager (LVM) to manage shared storage of VMs. An LVM can concatenate, stripe together, or otherwise combine shared physical storage partitions into larger virtual ones that administrators can re-size or move. Conventionally, an LVM used as part of a virtualization system would compose a VM of one or more virtual disks, where a virtual disk would be one or more logical volumes. Initially, a virtual disk would be just one logical volume, but as snapshots of the VM are taken, more logical volumes are associated with the VM. The use of an LVM in a virtualization system solves the scalability issue presented with a clustered file system solution, but still introduces administrative problems due to the complication of working directly with raw devices and lacks the ease of administration that can be found with use of a file system.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 3 is a flow diagram illustrating a method for managing VM files in a logical volume of shared storage that represents the VM by utilizing a file system mounted on top of the logical volume according to an embodiment of the invention.

DETAILED DESCRIPTION

Figure 1:
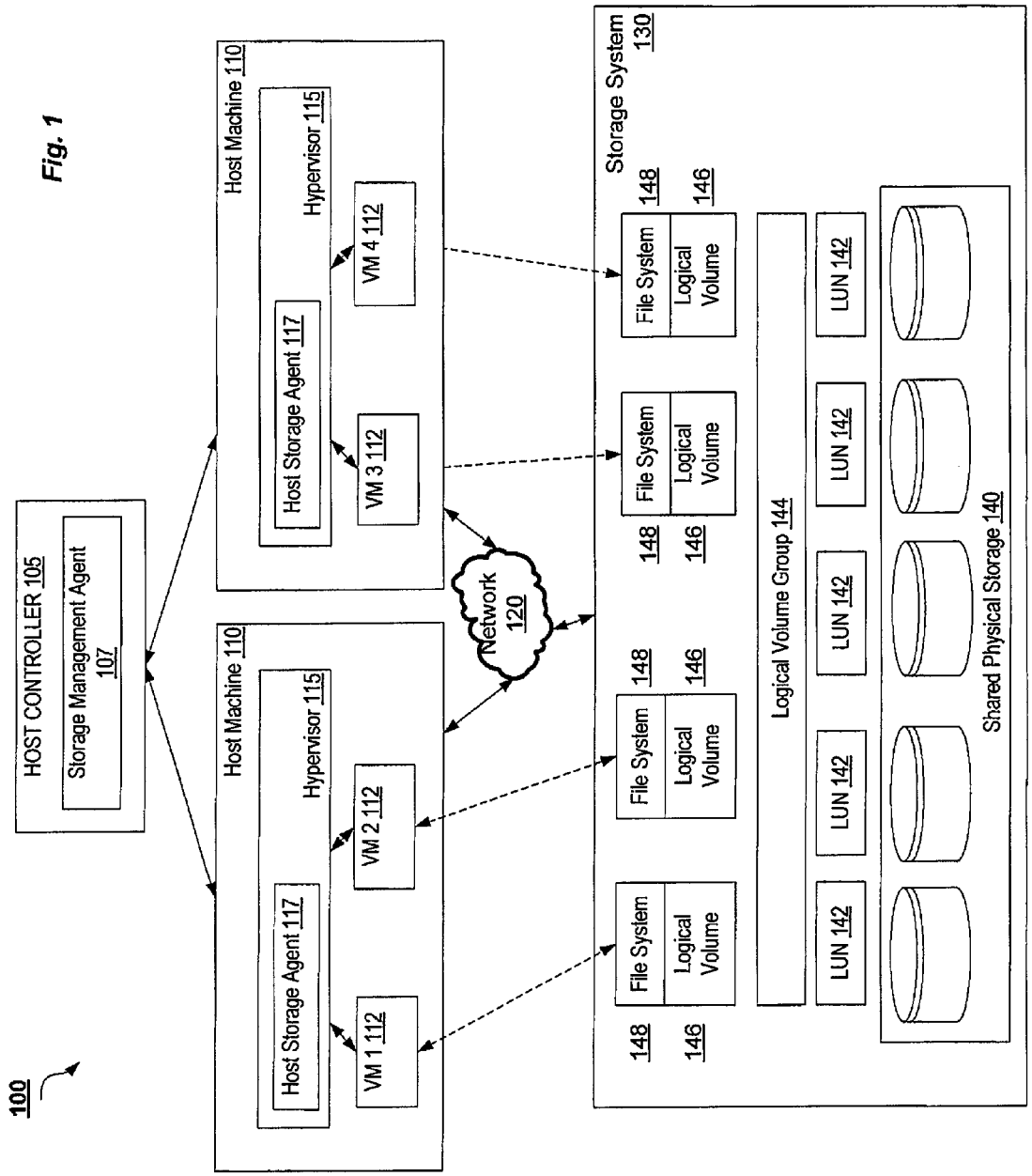
FIG. 1 is a block diagram of a virtualization system according to an embodiment of the invention.

Embodiments of the invention provide for storing virtual machines on a file system in a distributed environment. A method of embodiments of the invention includes initializing creation of a VM, allocating a volume from a logical volume group of a shared storage pool to the VM, and creating a file system on top of the allocated logical volume, the file system to manage all files, metadata, and snapshots associated with the VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "initializing", "allocating", "creating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for storing virtual machines on a file system in a distributed environment. Instead of the previous conventional shared storage implementation of using a logical volume manager to give host machines access to the raw devices providing the shared storage, embodiments of the invention use a clustered volume manager (e.g., a logical volume manager (LVM)) to implement a file system per VM. Specifically, each VM is associated with a logical volume that is defined as a separate file system. Each file system contains all the data and metadata pertinent to a single VM. This eliminates the need to synchronize most metadata changes across host machines and allows scaling to hundreds of nodes or more.

FIG. 1 is a block diagram of a virtualization system 100 according to an embodiment of the invention. Virtualization system 100 may include one or more host machines 110 to run one or more virtual machines (VMs) 112. Each VM 112 runs a guest operating system (OS) that may be different from one another. The guest OS may include Microsoft™ Windows™, Linux™, Solaris™, Macintosh™ OS, etc. The host machine 110 may also include a hypervisor 115 that emulates the underlying hardware platform for the VMs 112. The hypervisor 115 may also be known as a virtual machine monitor (VMM), a kernel-based hypervisor or a host operating system.

In one embodiment, each VM 112 may be accessed by one or more of the clients over a network (not shown). The network may be a private network (e.g., a local area network (LAN), wide area network (WAN), intranet, etc.) or a public network (e.g., the Internet). In some embodiments, the clients may be hosted directly by the host machine 110 as a local client. In one scenario, the VM 112 provides a virtual desktop for the client.

As illustrated, the host 110 may be coupled to a host controller 105 (via a network or directly). In some embodiments, the host controller 105 may reside on a designated computer system (e.g., a server computer, a desktop computer, etc.) or be part of the host machine 110 or another machine. The VMs 112 can be managed by the host controller 105, which may add a VM, delete a VM, balance the load on the server cluster, provide directory service to the VMs 112, and perform other management functions.

In some embodiments, the operating system (OS) files, application files, and data associated with the VM 112 may all be stored in a file or device that sits somewhere in a shared storage system 130 that is accessible to the multiple host machines 110 via network 120. When the host machines 110 have access to this data, then they can start up any VM 112 with data stored in this storage system 130.

In some embodiments, the host controller 105 includes a storage management agent 107 that monitors the shared storage system 130 and provisions storage from shared storage system 130 as necessary. Storage management agent 107 of host controller 105 may implement a logical volume manager (LVM) to provide these services.

Embodiments of the invention also include a host storage agent 117 in the hypervisor 115 of host machine 110 to allocate a single logical volume 146 for a VM 112 being created and also to create a file system 148 on top of the single logical volume 146. As such, in embodiments of the invention, each logical volume 146 of shared storage 140 is defined as a separate file system 148 and each file system 148 contains all data and metadata pertinent to a single VM 112. This eliminates the need to synchronize most metadata changes across host machines 110 and allows scaling to hundreds of host machine nodes 110 or more. In some embodiments, host storage agent 117 may utilize a LVM to perform the above manipulations of shared storage system 130. Host storage agent 117 may also work in conjunction with storage management agent 107 of host controller 105 to provide these services.

More specifically, in embodiments of the invention, shared storage system 130 includes one or more shared physical storage devices 140, such as disk drives, tapes drives, and so on. This physical storage 140 is divided into one or more logical units (LUNs) 142 (or physical volumes). Storage management 107 treats LUNs 142 as sequences of chunks called physical extents (PEs). Normally, PEs simply map one-to-one to logical extents (LEs). The LEs are pooled into a logical volume group 144. In some cases, more than one logical volume groups 144 may be created. A logical volume group 144 can be a combination of LUNs 142 from multiple physical disks 140. The pooled LEs in a logical volume group 144 can then be concatenated together into virtual disk partitions called logical volumes 146.

Previously, systems, such as virtualization system 100, used logical volumes 146 as raw block devices just like disk partitions. VMs 112 were composed of many virtual disks, which were one or more logical volumes 146. However, embodiment's of the invention provide a separate file system for each VM 112 in virtualization system 100 by associating a single VM 112 with a single logical volume 146, and mounting a file system 148 on top of the logical volume 146 to manage the snapshots, files, and metadata associated with the VM 112 in a unified manner. Virtual disks/snapshots of the VM are filed inside the file system 148 associated with the VM 122. This allows end users to treat a virtual disk as a simple file that can be manipulated similar to any other file in a file system (which was previously impossible because a raw device would have to be manipulated).

The creation of file system 148 for a VM 112 is performed by a host machine 110 upon creation of the VM 112. In some embodiments, simple commands known by one skilled in the art can be used to create a file system on top of a logical volume 146. For example, in Linux, a 'make file system' command can be used to create the file system 148. Once created, the file system 148 for a VM 112 is accessible in the shared storage system 130 by any other host machine 110 that would like to run the VM 112. However, only one host machine may access the file system at a time, thereby avoiding synchronization and corruption issues.

An added benefit of embodiments of the invention for virtualization systems 100 is the reductions in frequency of extend operations for a VM 112. Generally, a VM 112 is initially allocated a sparse amount of storage out of the shared storage pool 130 to operate with. An extend operation increases the storage allocated to a VM 112 when it is detected that the VM 112 is running out of storage space. In virtualization systems, such as virtualization system 100, only one host machine 110 at a time is given the authority to create/delete/extend logical volumes 146 in order to avoid corruption issues. If a different host machine 110 than the host machine 110 with extend authority needs to enlarge a logical volume 146, then it must request this extend service from the host machine 110 with that authority or get exclusive access itself. This operation results in some processing delay for the host machine 110 requesting the extend service from the host machine 110 with the extend authority.

Previous storage architectures resulted in frequent extend operation requests because any time a VM 112 needed to file a new snapshot (i.e., create new virtual disk), it would have to request this service from another host machine 110. With embodiments of the invention, storage will be allocated per VM instead of per snapshot or part of a virtual disk. As each VM has its own file system, the VM can grow this file system internally and, as a result, the extend operation requests should become less frequent.

Figure 2:
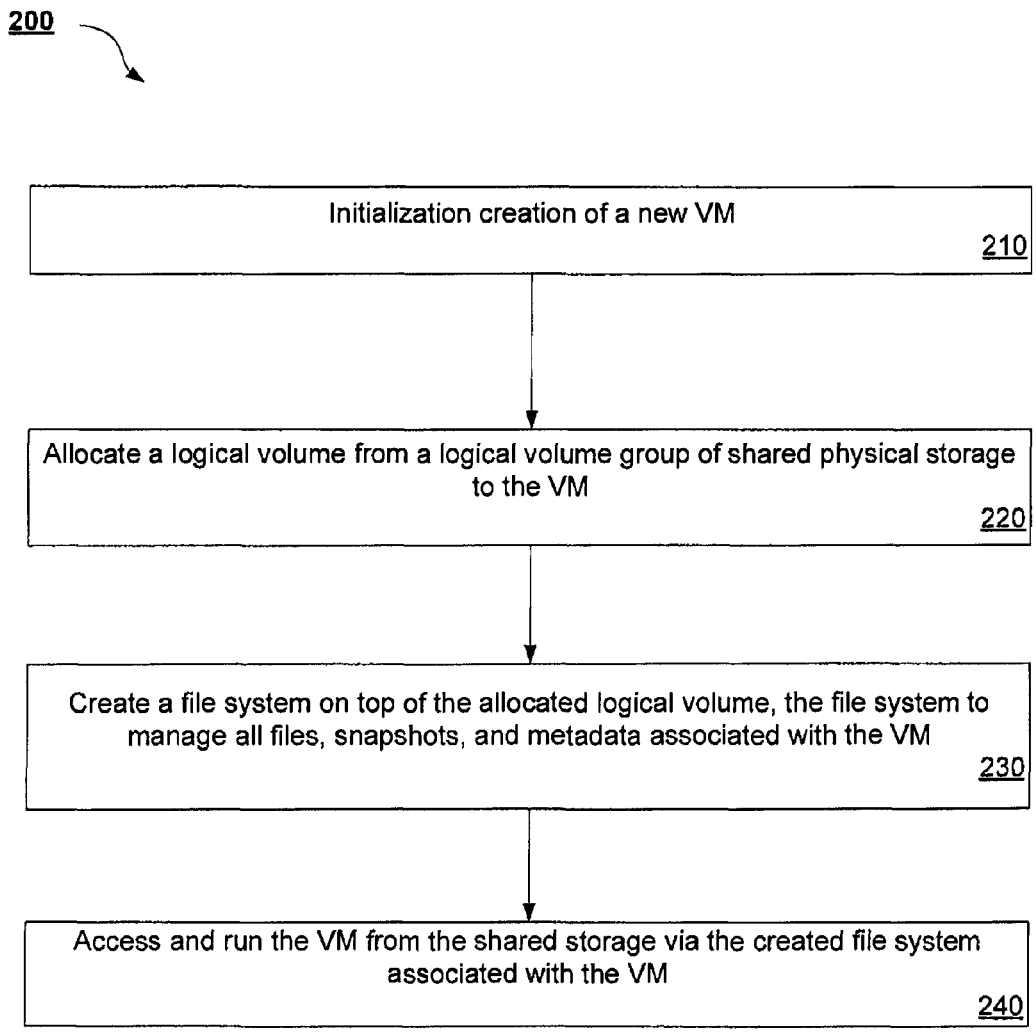
FIG. 2 is a flow diagram illustrating a method for creating a file system on top of a logical volume representing a VM in shared storage according to an embodiment of the invention.

FIG. 2 is a flow diagram illustrating a method 200 for creating a file system on top of a logical volume representing a VM in shared storage according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by hypervisor 115, and more specifically host storage agent 117, described with respect to FIG. 1. In some embodiments, storage management agent 107 of host controller 105 of FIG. 1 may be capable of performing portions of method 200.

Method 200 begins at block 210 where the creation of a new VM is initialized by a host machine. In one embodiment, this host machine has access to a shared pool of storage that is used for VMs. At block 220, a logical volume is allocated to the VM from a logical volume group of the shared pool of storage.

Subsequently, at block 230, a file system is created on top of the allocated logical volume. The file system may be created using any simple command known to those skilled in the art, such as a 'make file system' (mkfs) command in Linux. The file system is used to manage all of the files, metadata, and snapshots associated with the VM. As such, a virtual disk associated with the VM may be treated as a file within the file system of the VM, and the virtual disk can be manipulated (copied, deleted, etc.) similar to any other file in a file system. Lastly, at block 240, the VM is accessed and run from the shared storage pool via the created file system that is associated with the VM.

FIG. 3 is a flow diagram illustrating a method 300 for managing VM files in a logical volume of shared storage that represents the VM by utilizing a file system mounted on top of the logical volume according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by host storage agent 117 of FIG. 1.

Method 300 begins at block 310 where a VM is initialized to be run on a host machine. As part of this initialization, a file system of the VM is mounted on the host machine in order to use to access the VM. The file system is mounted on top of a logical volume that is associated with the VM, where the logical volume is part of a shared pool of storage. At block 320, any snapshots (e.g., virtual disks) created as part of running the VM on the host machine are filed into the mounted file system associated with the VM.

At block 330, all files and metadata associated with the VM are managed via the mounted file system. The management of these files and metadata is done using typical commands of the particular mounted file system of the VM. Lastly, at block 340, the VM is shut down and the mounted file system is removed from the host machine.

Figure 4:
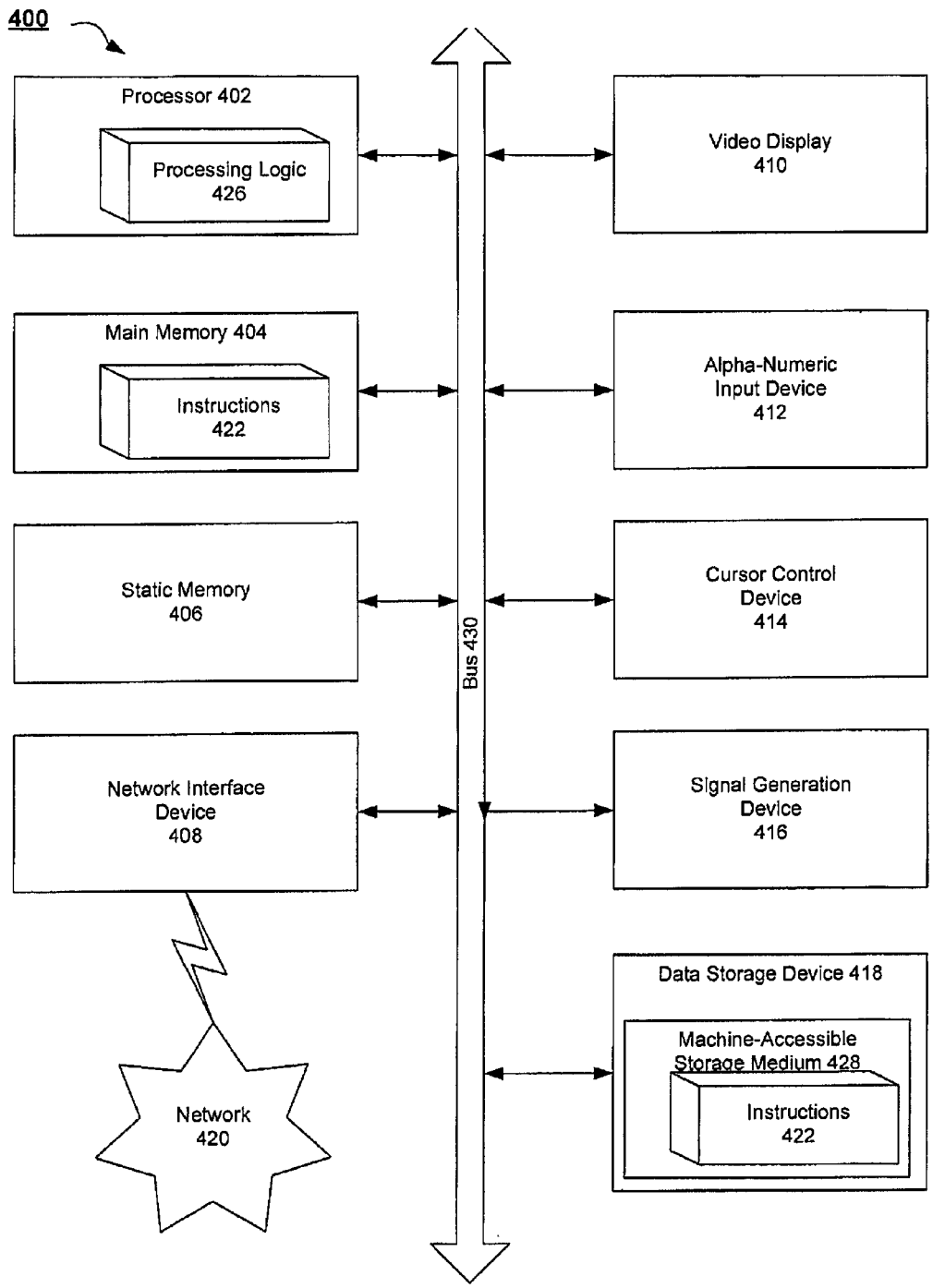
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more specialpurpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform implementing a VM file system using a logical volume manager in a virtualization system 100 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to perform methods 200 and 300 for implementing a VM file system using a logical volume manager in a virtualization system described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   initializing, by a hypervisor executed by a processing device of a host machine, creation of a plurality of virtual machines (VMs); and
   for each VM of the plurality of VMs:
   allocating, by the hypervisor, a logical volume from a logical volume group of a shared storage pool to the VM, the allocated logical volume solely assigned to the VM;
   mounting, by the hypervisor, a file system dedicated to the VM on the allocated logical volume assigned to the VM, the dedicated file system to manage information of the VM stored in the allocated logical volume and does not manage information of other allocated logical volumes assigned to other VMs of the plurality of VMs, wherein the information of the VM assigned to the allocated logical volume comprises virtual disks, snapshots, data, and metadata of the VM; and
   filing, by the hypervisor, the virtual disks, the snapshots, the data, and the metadata of the VM inside the dedicated file system of the VM on the allocated logical volume assigned to the VM, wherein the filed virtual disks, snapshots, data and metadata are each treated as files in the dedicated file system, and wherein the virtual disks are separate from the allocated logical volume.

2. The method of claim 1, wherein the shared storage pool comprises a plurality of disparate physical storage disks.

3. The method of claim 1, wherein a VM of the plurality of VMs is accessed and executed from the shared storage by mounting the file system dedicated to the VM on the host machine.

4. The method of claim 1, wherein any of a plurality of other host machines access and execute a VM of the plurality of VMs from the shared storage by mounting the file system dedicated to the VM on the any other host machine.

5. The method of claim 4, wherein only one host machine of the plurality of host machines can access a dedicated file system of a VM of the plurality of VMs at any point in time.

6. The method of claim 1, wherein one or more snapshots created as part of running a VM of the plurality of VMs on the host machine are filed into the file system dedicated to the VM.

7. The method of claim 1, wherein creating the dedicated file system comprises executing a make file system command from the hypervisor.

8. The method of claim 1, wherein the files and metadata of a VM of the plurality of VMs are managed using file system commands of the dedicated file system.

9. A host machine, comprising:
   a processing device;
   a memory communicably coupled to the processing device; and
   a hypervisor to execute a plurality of virtual machines (VMs) from the memory that share use of the processing device, the hypervisor to, for each VM of the plurality of VMs:
   allocate a logical volume from a logical volume group of a shared storage pool to the VM, the allocated logical volume solely assigned to the VM;
   mount a file system dedicated to the VM on the allocated logical volume assigned to the VM, the dedicated file system to manage information of the VM stored in the allocated logical volume and does not manage information of other allocated logical volumes assigned to other VMs of the plurality of VMs, wherein the information of the VM assigned to the allocated logical volume comprises virtual disks, snapshots, data, and metadata of the VM; and
   file the virtual disks, the snapshots, the data, and the metadata of the VM inside the dedicated file system of the VM on the allocated logical volume assigned to the VM, wherein the filed virtual disks, snapshots, data and metadata are each treated as files in the dedicated file system, and wherein the virtual disks are separate from the allocated logical volume.

10. The host machine of claim 9, wherein the shared storage pool comprises a plurality of disparate physical storage disks.

11. The host machine of claim 9, wherein a VM of the plurality of VMs is accessed and executed from the shared storage by mounting the file system dedicated to the VM on the host machine.

12. The host machine of claim 9, wherein any of a plurality of other host machines access and execute a VM of the plurality of VMs from the shared storage by mounting the file system dedicated to the VM on the any other host machine.

13. The host machine of claim 9, wherein one or more snapshots created as part of running a VM of the plurality of VMs on the host machine are filed into the file system dedicated to the VM.

14. The host machine of claim 9, wherein creating the dedicated file system comprises executing a make file system command from the hypervisor.

15. The host machine of claim 9, wherein the files and metadata of a VM of the plurality of VMs are managed using file system commands of the dedicated file system.

16. A non-transitory a machine-readable storage medium including instructions that, when accessed by a processing device, cause the processing device to:
   initialize, by the processing device of a host machine, creation of a plurality of virtual machines (VMs); and
   for each VM of the plurality of VMs:
      allocate, by the hypervisor, a logical volume from a logical volume group of a shared storage pool to the VM, the allocated logical volume solely assigned to the VM;
      mount, by the hypervisor, a file system dedicated to the VM on the allocated logical volume assigned to the VM, the dedicated file system to manage information of the VM stored in the allocated logical volume and does not manage information of other allocated logical volumes assigned to other VMs of the plurality of VMs, wherein the information of the VM assigned to the allocated logical volume comprises virtual disks, snapshots, data, and metadata of the VM; and
      file, by the hypervisor, the virtual disks, the snapshots, the data, and the metadata of the VM inside the dedicated file system of the VM on the allocated logical volume assigned to the VM, wherein the filed virtual disks, snapshots, data and metadata are each treated as files in the dedicated file system, and wherein the virtual disks are separate from the allocated logical volume.

17. The non-transitory a machine-readable storage medium of claim 16, wherein the shared storage pool comprises a plurality of disparate physical storage disks.

18. The non-transitory a machine-readable storage medium of claim 16, wherein a VM of the plurality of VMs is accessed and executed from the shared storage by mounting the file system dedicated to the VM on the host machine.

19. The non-transitory a machine-readable storage medium of claim 16, wherein any of a plurality of other host machines access and execute a VM of the plurality of VMs from the shared storage by mounting the file system dedicated to the VM on the any other host machine.

20. The non-transitory a machine-readable storage medium of claim 16, wherein one or more snapshots created as part of running a VM of the plurality of VMs on the host machine are filed into the file system dedicated to the VM.

* * * * *